Patented Nov. 17, 1931

1,832,415

UNITED STATES PATENT OFFICE

CLAYTON O. NORTH AND CHESTER W. CHRISTENSEN, OF AKRON, OHIO, ASSIGNORS TO THE RUBBER SERVICE LABORATORIES COMPANY, OF AKRON, OHIO, A CORPORATION OF OHIO

ANILINE-CROTONALDEHYDE CONDENSATION PRODUCT

No Drawing. Original applications filed May 19, 1924, Serial Nos. 714,467 and 714,468. Divided and this application filed February 18, 1927. Serial No. 169,407.

The present invention is directed to the art of manufacturing aldehyde-amine reaction products and particularly to the manufacture of such products by the interaction and combination of primary aromatic amines with unsaturated aliphatic aldehydes. The unsaturated aldehydes employed in the present invention, as are hereinafter more specifically disclosed, comprise any unsaturated aldehyde of the aliphatic series wherein the unsaturation, in addition to that present in the aldehyde grouping, also includes that present in the hydrocarbon nucleus of said compounds.

The unsaturation present in the hydrocarbon nucleous of such aldehydes may be either of the type known as the double bond, that is

or of the type referred to by chemists as the triple bond type, that is

Aliphatic aldehydes of these types must, of necessity, contain at least three carbon atoms, and as set forth in the claim of our invention, we limit ourselves in the manufacture of the aldehyde-amine reaction products, solely to the use of unsaturated straight chain aldehydes containing more than two and preferably not more than seven carbon atoms.

The process as set forth and claimed in the present invention produces compounds known as Schiff's bases when manufactured by the reaction of equi-molecular proportions of primary amines of the aromatic series with unsaturated aliphatic aldehydes. We have also found that these simple reaction products may be reacted with an additional quantity of the same or a different aldehyde and preferably with an unsaturated aliphatic aldehyde to produce other compounds of more complex chemical composition. Such compounds are then the aldehyde derivatives of Schiff's bases wherein either or both of the aldehydes employed are unsaturated and wherein the same or a different unsaturated aldehyde may be employed in the different steps of the process.

The products manufactured by the process hereinafter disclosed comprise materials useful as accelerators of the rubber vulcanization process as are set forth and claimed in our copending applications Serial Nos. 714,467 and 714,468, both filed May 19, 1924, and which have matured into Patent Numbers 1,670,312 of May 22, 1928, and 1,726,713 of Sept. 3, 1929, respectively. The present application is a division of the two patents referred to.

One mode of operating our present process is as follows. Equal molecular proportions of a primary aromatic amine and an unsaturated aliphatic aldehyde are mixed together and the mixture heated for any desirable time, for example, approximately three hours over the water bath. This is simply to insure complete interaction between the reaction substances, whereupon the water of condensation is distilled off, preferably by vacuum drying, at a temperature of about 90° C. The reaction may also be carried out by heating a mixture of equal molecular proportions of a primary aromatic amine and an unsaturated aliphatic aldehyde up to the temperature of the boiling water bath for a short time to break any suspension formed. The heating is then continued for a short time at a lower temperature and the mass is then allowed to stand at room temperature for a number of hours. The mixture is then heated for an hour or two over a boiling water bath to complete the reaction, and the product dried as before or by any other suitable means.

Differences in the procedure followed in making condensation products of the preferred type of compounds are dependent upon properties of the interacting ingredients. It is necessary to impose such reacting conditions as will enable complete interaction, that is, condensation to take place between the amine and the unsaturated straight chain aliphatic aldehyde chosen. Thus, by way of example, equal molecular proportions of aniline and of crotonaldehyde may be mixed together, and the mixture heated over a boiling water bath, any evaporation of the contents of the reaction vessel being prevented by connection with a reflux condenser. After about three hours heating, the product is vacuum dried at a temperature of about 90° C. In this case, the reaction taking place is probably as follows:

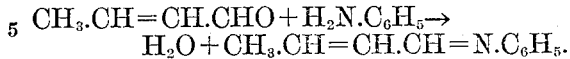

The aldehyde derivatives of the reaction products of unsaturated straight chain aldehydes with primary aromatic amines may be most readily prepared by heating together, over the water or steam bath, a mixture of a primary aromatic amine with a greater quantity of the aldehyde than is required to produce a simple mono-molecular condensation product. Thus, for example, aniline and crotonaldehyde may be mixed in the proportion of 93 parts of aniline and more than 70 parts of the aldehyde, and the mixture heated over a boiling water bath and maintained at that temperature for a period of time (approximately three hours) until it is certain that the reaction is completed, whereupon the water of condensation formed in the reaction is more or less completely removed by evaporation and the product is further heated at a temperature no higher than 110° C. until the material is practically or completely free of water. The material may also be produced in a two stage process, if desired, as is shown by the following example.

An amine, such as aniline, and an unsaturated aldehyde, such as crotonaldehyde, may be heated together in equi-molecular proportions (that is, 93 parts of aniline and 70 parts of crotonaldehyde). The mixture is heated over the boiling water bath as before for a period of some hours, whereby a simple condensation product is formed. Before or subsequent to the removal of the water of condensation, a further quantity of the same or a different aldehyde is added to the mixture and the heating continued under the same conditions as before. Further condensation takes place and there is formed the aldehyde derivative of the reaction product of an unsaturated aldehyde and an amine. The water present in the mixture is now more or less completely removed by careful heat treatment of the product at a temperature no higher than 110° C. whereupon a solid product is obtained.

Other amines and aldehydes than those cited in the examples given may also be employed. Thus, for example, we may combine any primary aromatic amine, such as aniline, a toluidine, a xylidine, naphthylamin, amino-cymene and the like with substantially equal molecular proportions of any unsaturated aldehyde such as acrolein, crotonaldehyde, methyl-ethyl-acrolein, propargylic aldehyde and the like, and then further react the product obtained with an additional quantity of the same or a different unsaturated aldehyde or with an excess of a saturated aldehyde such as formaldehyde, acetaldehyde, the polymeric aldehydes such as paraldehyde, or other aldehydes of the aliphatic series of organic compounds. Furthermore, it is possible to prepare a simple condensation product of an amine with an unsaturated aldehyde and then to use an excess of a different aldehyde or even an aldehyde fully saturated as regards the hydrocarbon nucleus to prepare the final compound. Thus, we may react equi-molecular quantities of o-toluidine or other primary aromatic amines with crotonaldehyde, acrolein or other unsaturated aldehyde and then react the product so formed with an excess of formaldehyde, acetaldehyde or other straight chain aliphatic aldehydes. As another instance of the possible compounds we may use in our process, we mention the product obtained by the action of formaldehyde or acetaldehyde on the reaction product of acrolein with an aromatic primary amine. The products formed are solids which become more brittle and resin-like as the proportion of aldehyde employed in the manufacture of the material is increased.

The foregoing examples are to be understood as illustrative of the preferred process but not limitative of the scope of the invention. Other modes of reacting a primary aromatic amine with an unsaturated aliphatic aldehyde, and other proportions of the materials than those specifically set forth may be employed. The invention is limited solely by the following claim in which we intend to define and claim our invention as broadly as is permissible in view of the prior art.

What is claimed is:

An aldehyde amine reaction product resulting from the condensation of aniline with more than an equi-molecular proportion of crotonaldehyde.

In testimony whereof we affix our signatures.

CLAYTON O. NORTH.
CHESTER W. CHRISTENSEN.